(12) United States Patent
Tennison et al.

(10) Patent No.: US 7,544,437 B2
(45) Date of Patent: Jun. 9, 2009

(54) FUEL CELL STRUCTURE

(75) Inventors: Stephen Robert Tennison, Addlestone (GB); Beverley Sowerby, Bath (GB)

(73) Assignee: Materials and Separation Technology International Limited, Henley Park, Guildford, Surrey (GB)

( * ) Notice: Subject to any disclaimer, the term of this patent is extended or adjusted under 35 U.S.C. 154(b) by 706 days.

(21) Appl. No.: 10/362,377

(22) PCT Filed: Aug. 16, 2001

(86) PCT No.: PCT/GB01/03674

§ 371 (c)(1),
(2), (4) Date: Sep. 5, 2003

(87) PCT Pub. No.: WO02/15308

PCT Pub. Date: Feb. 21, 2002

(65) Prior Publication Data

US 2004/0038117 A1    Feb. 26, 2004

(30) Foreign Application Priority Data

Aug. 16, 2000    (GB) .................................. 0020051.9

(51) Int. Cl.
*H01M 4/00*    (2006.01)
*H01M 8/10*    (2006.01)
*H01M 2/00*    (2006.01)
*H01M 2/02*    (2006.01)

(52) U.S. Cl. ............................. 429/40; 429/44; 429/30; 429/31; 429/34

(58) Field of Classification Search .................. 429/12, 429/34, 38, 30, 31, 40, 44
See application file for complete search history.

(56) References Cited

U.S. PATENT DOCUMENTS

| 3,607,410 | A | * | 9/1971 | Berger | ......................... 429/27 |
| 4,329,157 | A | * | 5/1982 | Dobo et al. | .................... 95/56 |
| 6,007,933 | A | * | 12/1999 | Jones | ......................... 429/38 |
| 6,589,682 | B1 | * | 7/2003 | Fleckner et al. | ............... 429/34 |

FOREIGN PATENT DOCUMENTS

| DE | 19628593 | 1/1998 |
| DE | 10040282 | 3/2002 |
| FR | 2788630 | 7/2000 |
| GB | 1052327 | 12/1966 |
| GB | 1061201 | 3/1967 |
| WO | WO 94/09519 | 4/1994 |
| WO | WO 96/04690 | 2/1996 |
| WO | WO 99/60648 | 11/1999 |

* cited by examiner

*Primary Examiner*—Patrick Ryan
*Assistant Examiner*—Eugenia Wang
(74) *Attorney, Agent, or Firm*—Bartlett & Sherer; Ronald B. Sherer; Gerow D. Brill

(57) ABSTRACT

An improved fuel cell structure uses a first sheet of carbon fibres separated by an electrolyte from a second sheet of carbon fibres. A fuel cell catalyst is coated on the outside of the fibres and the fuel passed down one set of fibres and oxygen or air passed down the second sheet of fibres.

4 Claims, 8 Drawing Sheets

FUEL CELL STRUCTURE

Figure 1:
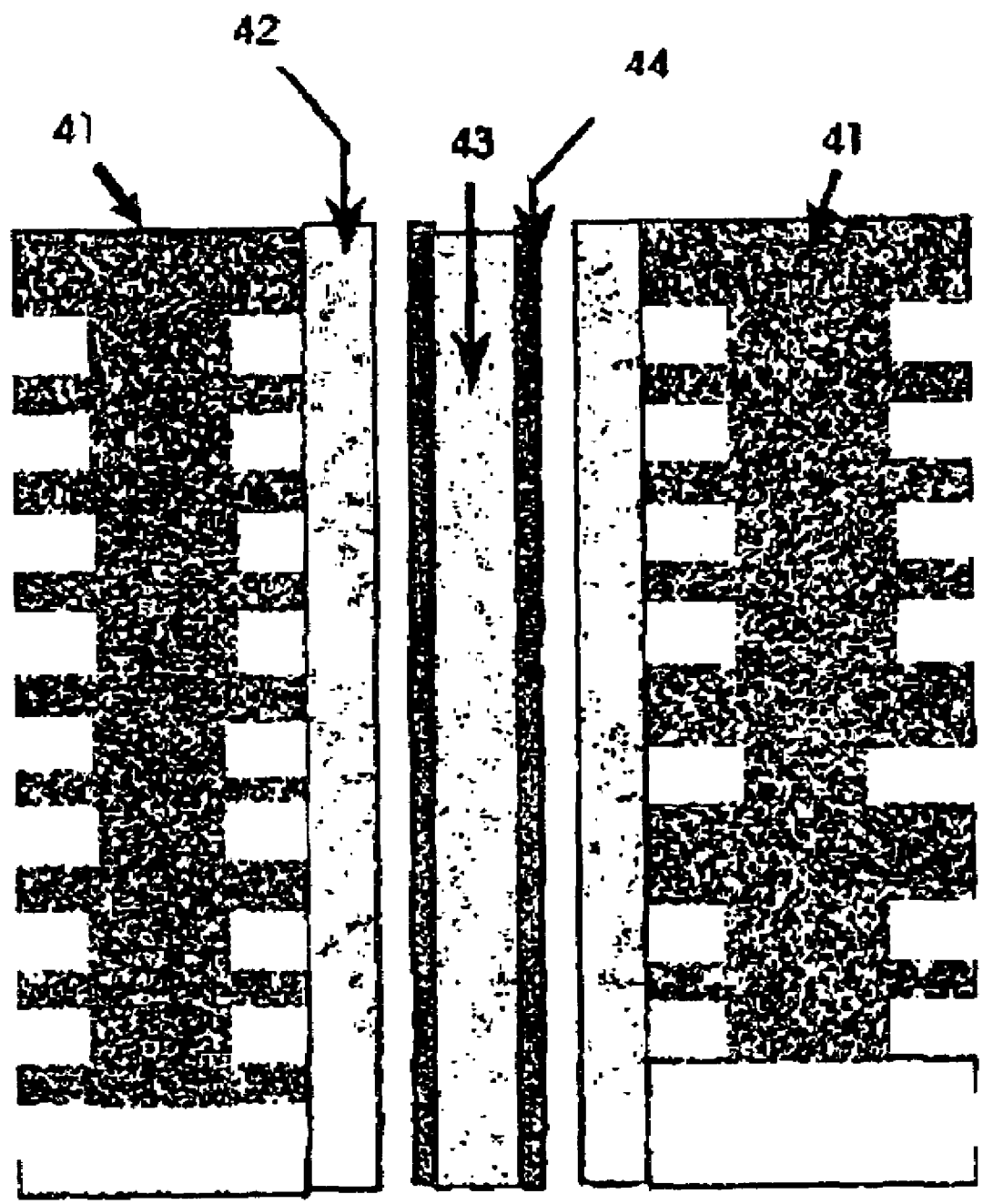

The present invention relates to a fuel cell, more particularly it relates to an improved fuel cell configuration.

In a basic polymer electrolyte membrane (PEM) fuel cell which uses hydrogen as a fuel, the fuel cell comprise anode and cathode bipolar graphite plates, which control the addition of the feed hydrogen and oxygen to the cell. In addition the cell has two gas permeable sheets of carbon paper which are coated on their inside with a catalyst, which are separated by a proton conducting membrane and which are impregnated with PTFE in order to control moisture penetration. The hydrogen is passed into the cathode chamber and oxygen is passed into the anode chamber. When the external circuit is completely by externally electrically connecting the cathode and anode, hydrogen passes through the PTFE impregnated carbon paper layer and is ionised by the catalyst. The protons formed then pass through the polymer electrolyte membrane (PEM) to the oxygen electrode where they combine with oxygen ions to produce water and electrons. The water generated is then primarily removed in the air stream.

To date the polymer electrolyte membranes (PEM) have usually been based on a fluorinated polymer made by DuPont and sold under the Trade Name "Nafion". This basically consists of tetrafluorethylene with perfluorovinyl monomers having sulphonate functional groups allowing for the conduction of protons to provide the functional groups. This polymer currently gives the best mix of mechanical strength and proton conductivity properties essential for the construction and portion of the cell although a wide variety of other polymers have been and are now being investigated, these include, DOW's XUS-13204.10 membrane electrolyte, Dais 585 (a sulphonated styrene-ethylene, butylene-styrene triblock copolymer) and Flemion (a carboxylic membrane).

The catalysts commonly used are platinum for the cathode and a platinum alloy such as platinum-ruthenium and platinum-molybdenum for the anode.

Generally the shorter the path length of the gas molecules through the carbon paper/PTFE catalyst support assemblies and the shorter the path length for the protons through the PEM the more efficient the cell will be as high transport resistances lead to a significant fall in cell voltage.

Operation at high current density, as is planned for commercial operation (typically in excess of 1000 ma/cm$^2$) will lead to a reduction in cell voltage to around 0.6V with the lower efficiency leading to a higher heat release from the cell.

The various components of fuel cell have to have a minimum thickness owing to the need for there to be coherent layers and for handle-ability during cell assembly. This means that for existing cells the path lengths through the various components of a fuel cell cannot be reduced below a minimum value. In particular, the thickness of the graphite bipolar plates is controlled by the need for the complex gas flow channels, which both transport the feed gases into the cell and have to remove the liquid water produced in the cell reaction, and by the mechanical properties of the graphite. At present thickness' of less than around 1-2 mm are unlikely to be attainable. The thickness of the carbon paper layer (which is also impregnated with PTFE to control wetting) has been progressively reduced to around 100-300 microns but is unlikely to reduce significantly further due to mechanical constraints whilst the PEM/catalyst layer thickness (membrane electrode assembly) seems to be approaching a minimum at around 200 microns which includes the 10 micron thick Platinum/carbon "ink" layer on each side of the polymer electrolyte. This gives an overall thickness for a single cell of around 2500-3000 microns.

The platinum loadings in the PEM cells has been progressively reduced from around 4 mg/cm$^2$ to 0.5 mg/cm$^2$ in commercial cells with some laboratory cells using as little as 0.15 mg/cm$^2$. The platinum is applied as an ink formed from platinum impregnated carbon which is "painted" or "printed" onto either side of the polymer electrolyte in a layer around 10 microns thick.

Another factor is the available surface are of catalyst per unit volume of the cell, with a larger surface area for a given size of a cell a larger current can theoretically be generated and the better the performance of the cell will be, but this is limited by the geometric size of the anode and cathode assemblies.

The individual cells are bipolar—that is to say that, in use, the cells are stacked together with each bipolar plate forming the negative side of one cell and the positive side of the adjacent cell. The current produced is carried directly through the cell without the requirement for any external connections—alternate said of the bipolar graphite plates are negative and positive with hydrogen being fed to one side of the plate and oxygen to the other. This demonstrates two further constraints on the bipolar plates—they must be totally gas impermeable and must also have a very low electrical resistance across the plate.

In order to improve the performance of the basic fuel cell a large number of incremental improvements have been patented over the last 20 years which have increased the cell power density from around 0.1W/cm$^3$ in 1990 to the 1.4W/cm$^3$ that is claimed for the latest cells.

The PTFE impregnated carbon paper combined with the catalyst layers and the proton conducting polymer layer is referred to as the membrane/electrode assembly. The evolution of membrane/electrode assemblies in polymer electrolyte membrane fuel cells has passed through several generations. The original membrane/electrode assemblies were constructed in the 1960s from the Gemini space program and used 4 milligrams of platinum per square centrimetre of membrane area (4 mg/cm$^2$). Current technology varies with the manufacturer, but total platinum loading has decreased from the original 4 mg/cm$^2$ to about 0.5 mg/cm$^2$. Laboratory research now uses platinum loadings f 0.15 mg/cm$^2$. The thickness of the membrane in a membrane/electrode assembly can vary with the type of membrane. The thickness of the catalyst layer depends upon how much platinum is used in each electrode. For catalyst layers containing about 0.15 mg Pt/cm$^2$, the thickness of the catalyst layer is close to 10 microns.

The central layer of the membrane/electrode assembly comprises a thin, ~50-200 micron, sheet of Nafion conducting polymer. The thickness of this layer has a major impact on the overall cell performance but, given the way the cells are constructed, it cannot be practically reduced too much below the current thickness. There is a large amount of work currently underway to find alternatives to Nafion to reduce the cell cost but finding a polymer with the required proton conductivity and acceptable mechanical properties has proved difficult.

The cell performance is limited by the diffusion of the water and the gases through the membrane layers as well as the electrical performance of the Pt and Nafion layers. An reduction in the thickness of the various transport layers can significantly improve the overall mass transfer performance of the cell however with this type of cell, although widely used it is difficult to obtain a substantial improvement in performance.

Fuel cells are described in a large body of literature including T R Ralph et al, 1997, J Electrochem Soc, 144, 11, 3845;

T E Springer et al, 1991, J Electrochem Soc, 138, 8, 2334; D M Bernardi and M W Verbrugge, 1992. J Electrochem Soc, 139, 9, 2477.

We have not devised a radically different design of fuel cell which overcomes many of the limitations imposed by the conventional bipolar plate PEM cell design.

According to the invention there is provided a fuel cell which comprises a first hollow electrically conductive gas permeable fibre which is coated on the outside with a fuel cell catalyst and which has a means to enable a fuel vapor or gas to be passed down the inside of the fibre and a second hollow electrically conductive gas permeable fibre which is coated on the outside with a fuel cell catalyst and which has a means to enable oxygen or an oxygen containing gas to be passed down the inside of the fibre, the first and second carbon fibres being separated by the electrolyte medium, which may be a solid polymer electrolyte such as Nafion or a liquid or gel electrolysis, and preferably by a polymeric mesh to ensure that the fibres do no touch which would give rise to a short circuit.

Any liquid or vapour fuel used in fuel cells can be used in the present invention e.g. hydrogen, methanol, etc.

In use the fuel gas or vapour e.g. hydrogen or methanol is passed down the inside of the first hollow fibre (cathode) and oxygen or an oxygen containing gas is passed down the inside of the second (anode) hollow fibre. The gases pass through the walls of the hollow carbon fibres. The hydrogen ionises to produce a proton and no electron at the catalyst at the cathode fibre surface and the proton diffuses through the electrolyte to the cathode fibre. At the anode fibre the oxygen is ionised at the catalyst at the fibre surface whereupon it reacts with the proton to complete the electrochemical reaction and generate an electric current as in conventional fuel cells. The anode and cathode catalyst can be selected from those materials known to work effectively in the respective anode and cathode environments.

Preferably there are a plurality of first and second hollow electrically conductive gas permeable fibres arranged with all the first hollow electrically conductive gas permeable fibres arranged side by side, preferably in rows, so as to form a first sheet of the fibres, and with the second hollow electrically conductive gas permeable fibres similarly arranged to form a second sheet of the second hollow electrically conductive gas permeable fibres. The fibres in each adjacent row are preferably at an angle to each other and are preferably substantially orthogonal to each other.

The electrically conductive gas permeable fibres in each layer are preferably aligned with their axes substantially parallel and may be in contact.

The first electrically conductive gas permeable fibre layer (anode) and the second electrically conductive gas permeable fibre layer (cathode) must be separated by the fuel cell proton conducting layer which is positioned in between them. The layers are also preferably separated by an electrically insulating polymeric mesh which maintains the required separation between the anode and cathode layers and prevents an electrical short between the layers.

However in the structure of the present invention is not necessary to have a solid membrane, such as the Nafion sheet used in conventional fuel cells, and the fibres can be separated by any means of separation which enables a flow of protons to take place. The structure of the present invention enables the fibres to be fixed in position with a small gap between them so that they do not come into contact but there is a short path through the electrolyte between them. The electrolyte can be a liquid, gel or solid polymer.

The individual fibres in each layer are be electrically connected to each other at one or preferably both ends e.g. by means of a conductor plate or block. This conductor plate or block can be formed from for instance silver loaded epoxy adhesive as used in electrical circuits and is commercially available. Alternatively the ends of the fibres can be copper or nickel plated using either electroplating or electroless plating and then soldered together. In either case the conducting block so formed can contain a metal mesh that provides the means for making the external electrical connected to the cell.

A multilayered block can be formed in which there are a number of alternate layers comprising a layer of the first electrically conductive gas permeable fibres forming cathodes an a layer of the second electrically conductive gas permeable fibres forming the anodes with the fibres in each alternate layer substantially orthogonal to each other. The layers are separated as referred to above. As well as the cathode fibres being connected together and the anode fibres being connected together in each block plurality of blocks can be connected together in series or parallel depending on the voltage and current requirements. Such a multi cell arrangement can be preferentially formed within a single polymer block which contains all of the necessary gas interconnections such that only a single act of hydrogen or oxygen connections are required irrespective of the number of cells. The means for electrically interconnecting the cells can also be incorporated within the block through for instance a printed circuit array, built for instance into the top or base of the block, that allows any mixture of series and parallel interconnections to meet any given voltage-current requirement.

The electricity generated is conducted away from the fuel cell structure by a conductor attached to the ends of the hollow carbon fibres using conventional contacts. As the electric current generated is taken from the fuel cell by a conductor electrically connected to the hollow fibres, the axes of the hollow carbon fibres forming the anodes and cathodes being substantially orthogonal to each other facilitates the leading away of the generated electric current.

The fibres in each layer being aligned orthogonally to the fibres in the adjacent layer also facilitates the feeding of the gases to each layer of fibres and the removal of water vapour and any other gases or vapours generated when a fuel other than hydrogen is used.

We have also found that due to the small size of the cell heat removal is straightforward and there is no requirement for additionally cooling facilities other than perhaps a finned array, as used to cool computer ships, on the upper and/or lower surfaces of the cell block. This can also if required be further cooled by a fan array as used with computer processor chips.

The outside diameter of the individual hollow fibres is preferably from 80 to 1500 microns e.g. 80 to 500 microns and more preferably from 100 and 300 microns. The wall thickness of the hollow carbon fibre is preferably from 10 to 200 microns e.g. 10 to 100 microns and more preferably from 20 to 100 microns. The inside diameter of the individual fibres is preferably from 150 to 1300 microns, more preferably from 70 to 250 microns.

The hollow fibres carry out the combined functions of the graphite plates and the carbon paper assemblies in the conventional fuel cells described above. As such the fibres should have sufficient conductivity to carry the current generated without an excessive ohmic loss. The electrical conductivity of the fibres can be enhanced by high temperature heat treatment although care must be exercised that such treatment does not excessively reduce the gas permeability of the fibre walls. In the even that the permeability is reduced excessively by heat treatment the porosity and permeability can be restored by careful oxidation of the fibre. This is preferentially carried out using high temperature steam or carbon dioxide to ensure that the activating gas penetrates through the fibre.

The anode and cathode catalyst can be deposited within the outer surface of the carbon fibres conventional catalyst preparation techniques, but preferentially uses methods that do not require heating to reduce the active metal components. Such methods include for instance ion exchange followed by reduction using e.g. formaldehyde or electroless plating. The surface of the carbon fibres is preferentially treated prior to ion exchange to enhance the acidity and ion exchange capacity. Typical methods include for instance mild air activation or treatment with nitric acid. Careful air activation has the benefit of limiting the development of the acidity to the surface region of the fibre which helps to ensure that the catalytic metal is predominantly present at the surface of the fibre rather than being uniformly deposited throughout the fibre. Care must be taken during these stages as the nature of the carbon fibre and the way in which the catalyst is added will effect the hydrophobic characteristics of the fibre pore structure. It is not anticipated that PTFE modifications will be requited to control the water permeating characteristics of the fibres although other chemical treatments, such as bromination could be used to reduce water permeation.

The fuel cell catalyst is not critical and any fuel cell catalyst can be used in the present invention which will work with the fuel used. Most catalysts are based on platinum or platinum group metal catalysts and a very large number of catalyst compositions have been proposed.

The length of the fibres is fixed by the fibre resistivity and the permitted level of ohmic losses in the cell. The optimum cell dimension will be function of the fibre resistivity, the fibre dimensions and the cell operating characteristics. The high volumetric efficiency of the hollow fibre design permits the operation of the cell at much lower current densities (amps/$cm^2$) than is normally permitted, and at the lower power densities high fibre resistivities or longer fibre lengths can be tolerated. The most efficient cell design will use the maximum possible fibre length, subject to ohmic loss constraints, as this will minimise the number of fibre end connections that will be necessary. When air is used as the oxidising agent the volume of air required is much larger than the volume of a fuel such as hydrogen flowing down the fuel containing fibres and this could lead to a cell in which the fibres carrying the air are of a larger diameter than those carrying the hydrogen fibre length is 1 cm or greater e.g. 5 cm and has a surface area of about 0.6 $cm^2$.

Proton conducting materials which can be used in the fuel cell structure of the present invention include any known proton conducting material and is not limited to the solid polymer electrolyte membranes used in conventional cells. Possible electrolytes include those used and disclosed for use in fuel cells.

In traditional bipolar plate PEM fuel cells, complete electrode structures are usually developed either (i) by using preformed electrode structures that contain a carbon supported catalyst and polytetafluoroethylene and then incorporating a soluble electrolyte component in the final processing step or (ii) by premixing together the electrocatalyst and the soluble polymer components and applying them in a single coating step. Such electrode structures are then usually 'printed' onto the carbon fibre substrate to form the complete electrode structure (reference, Ralph, et al, 1997, J Electrochem Soc, 144, 11, 3845). In this invention, the catalyst will be preferentially pre-impregnated on to the carbon fibres and the carbon fibres will then be assembled after which the free space in between the fibres will be filled with a polymer conducting membrane.

When a solid "Nafion" type membrane is used the fibre in each layer are separated by the membrane and a block structure can be formed in which the fibres in each layer are separated from the fibres in the adjacent layer and held in position by the membrane. This structure can be formed placing the membrane between the layers of first and second hollow fibres and hot pressing the structure to form a compact structure. Alternatively the polymer can be added by e.g. solution casting. In this case it is preferable although not essential to use the polymer mesh separator. In the case of liquid or gel electrolytes it will be necessary to use the polymer mesh separator.

The carbon fibres used in the present invention can be made by known methods e.g. from polymer precursors.

The invention provides a fuel cell structure which is compact and gives a higher power/weight ration and higher power/volume ratio than existing fuel cell. This makes it ideal for use in for instance portable electrical devises such as computers, power tools etc.

The carbon based fibre cell of the present invention will allow operation at lower current densities, potentially as low as 100-200 $mA/cm^2$, and therefore higher efficiency, without comprising overall volumetric efficiency.

The invention is described with reference to the accompanying drawings in which FIG. 1 relates to prior art fuel cells and in which:—

FIG. 1 shows a diagrammatic view of a cell of bipolar plate PEM assembly

Figure 2:
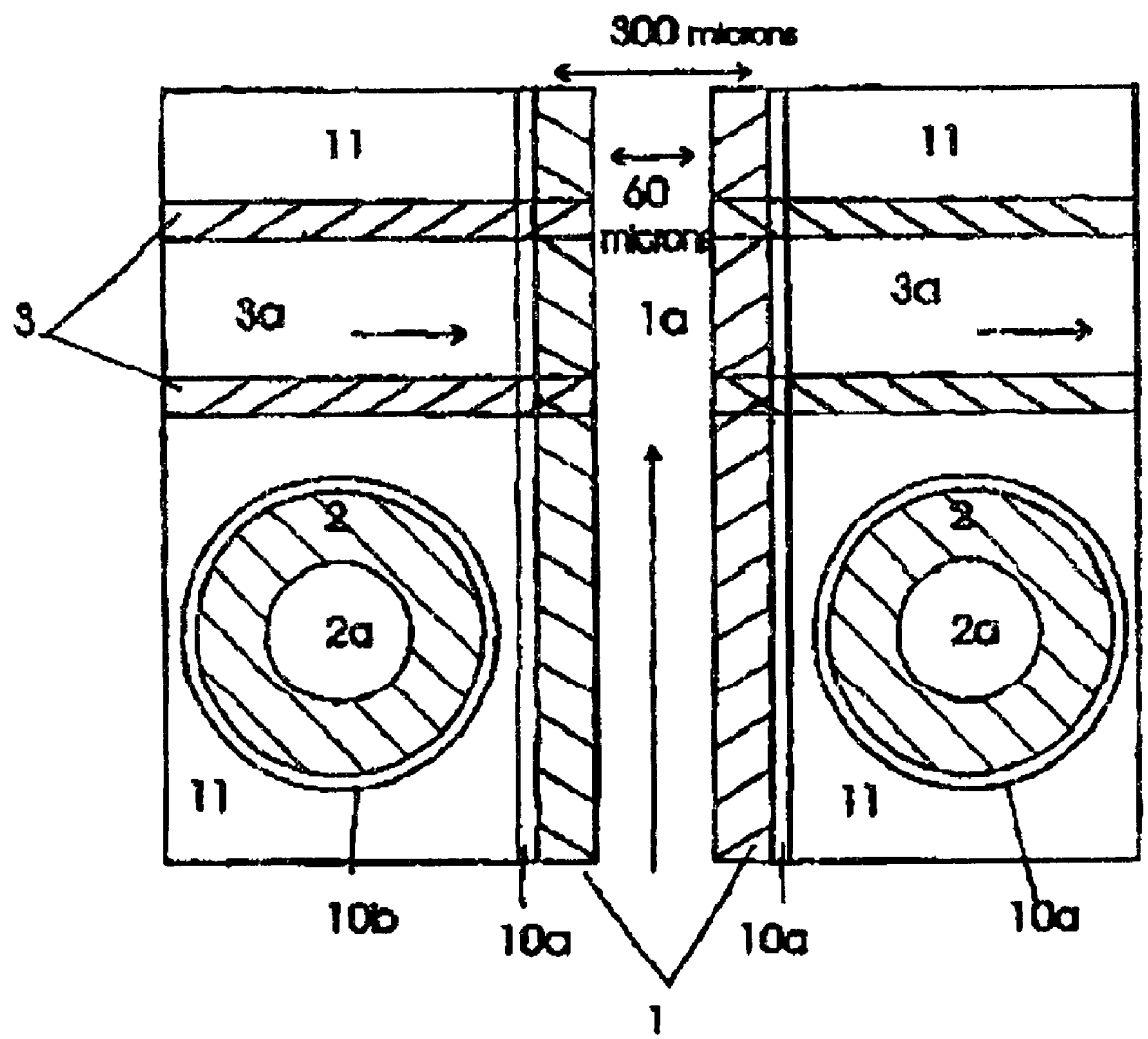
Figure 3:
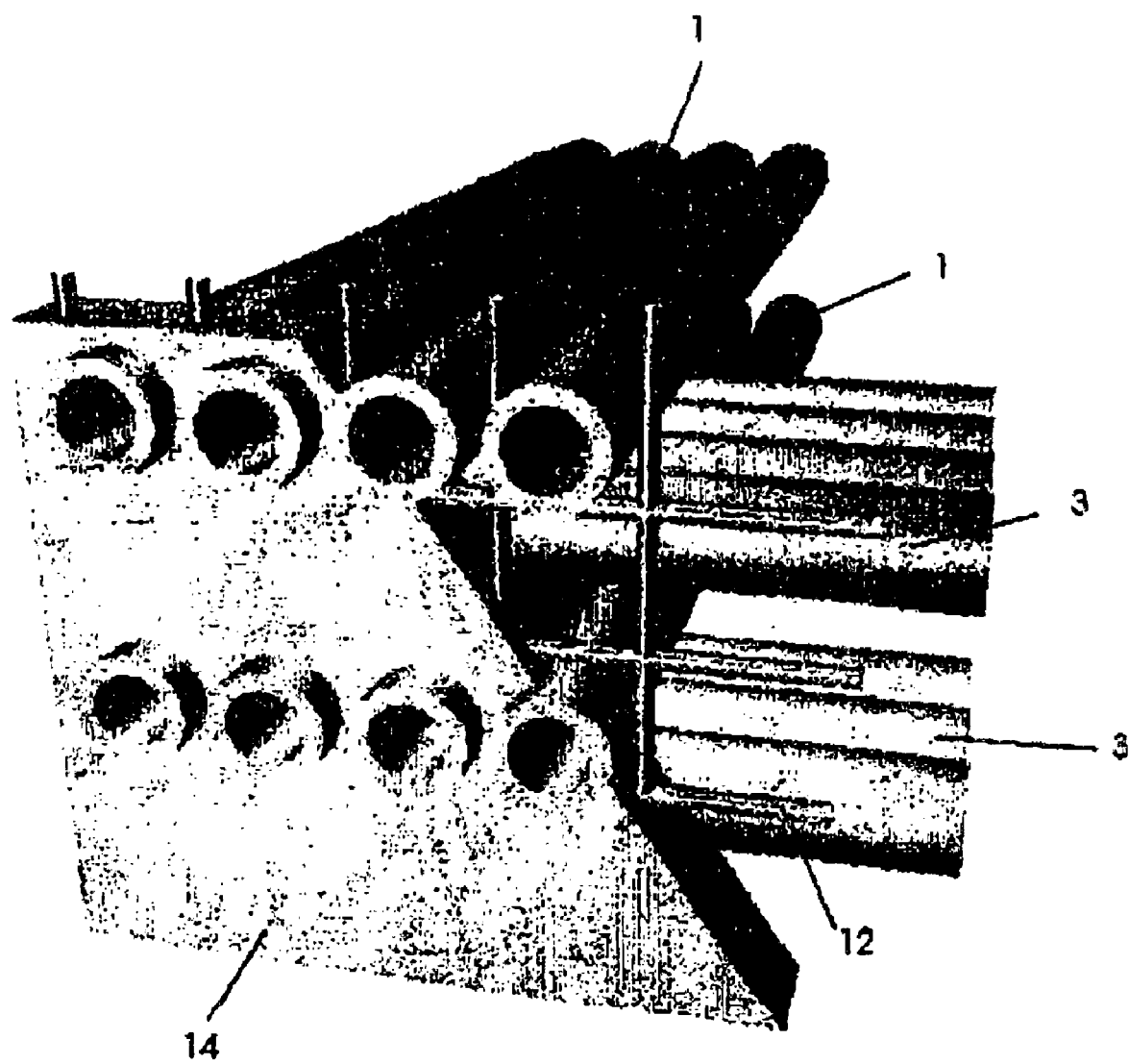
Figure 4:
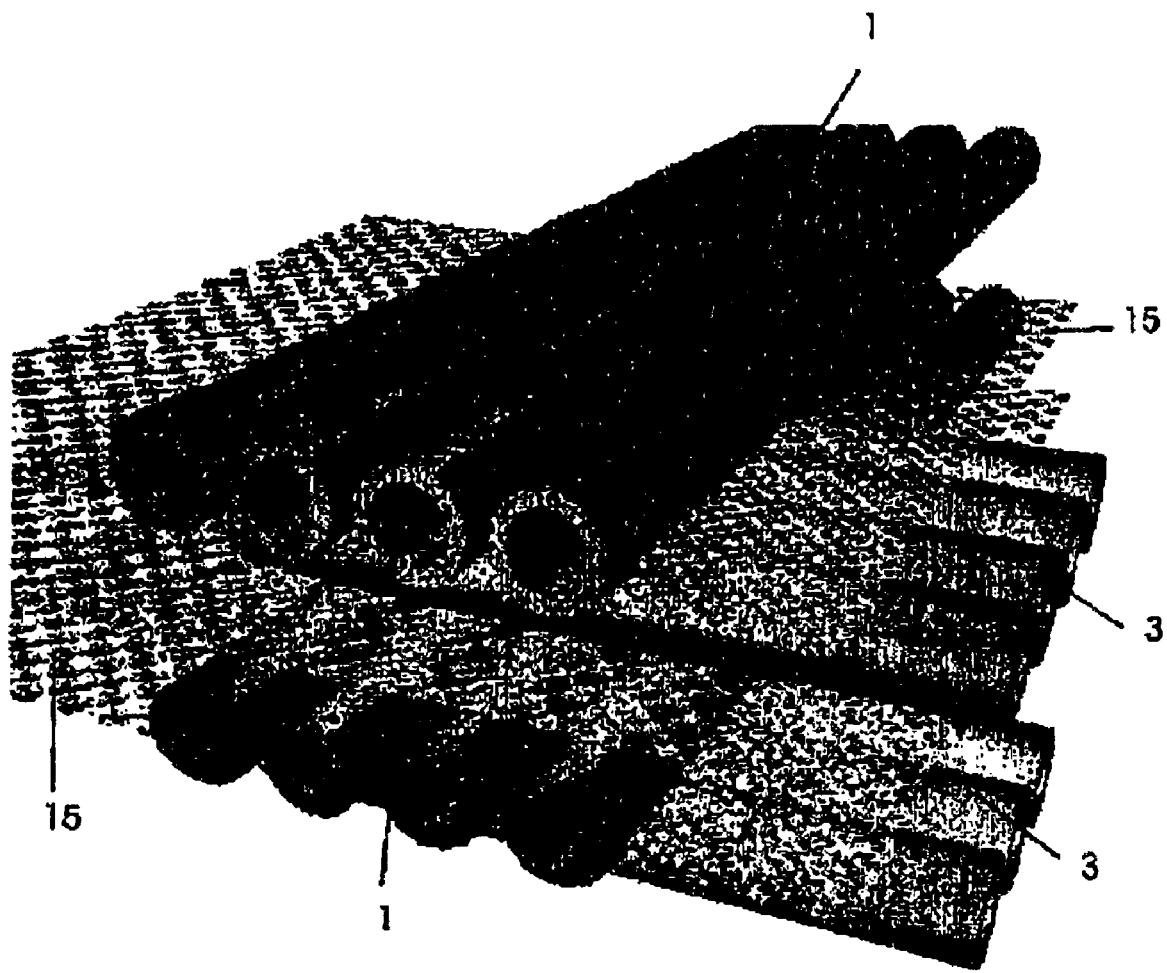
Figure 5:
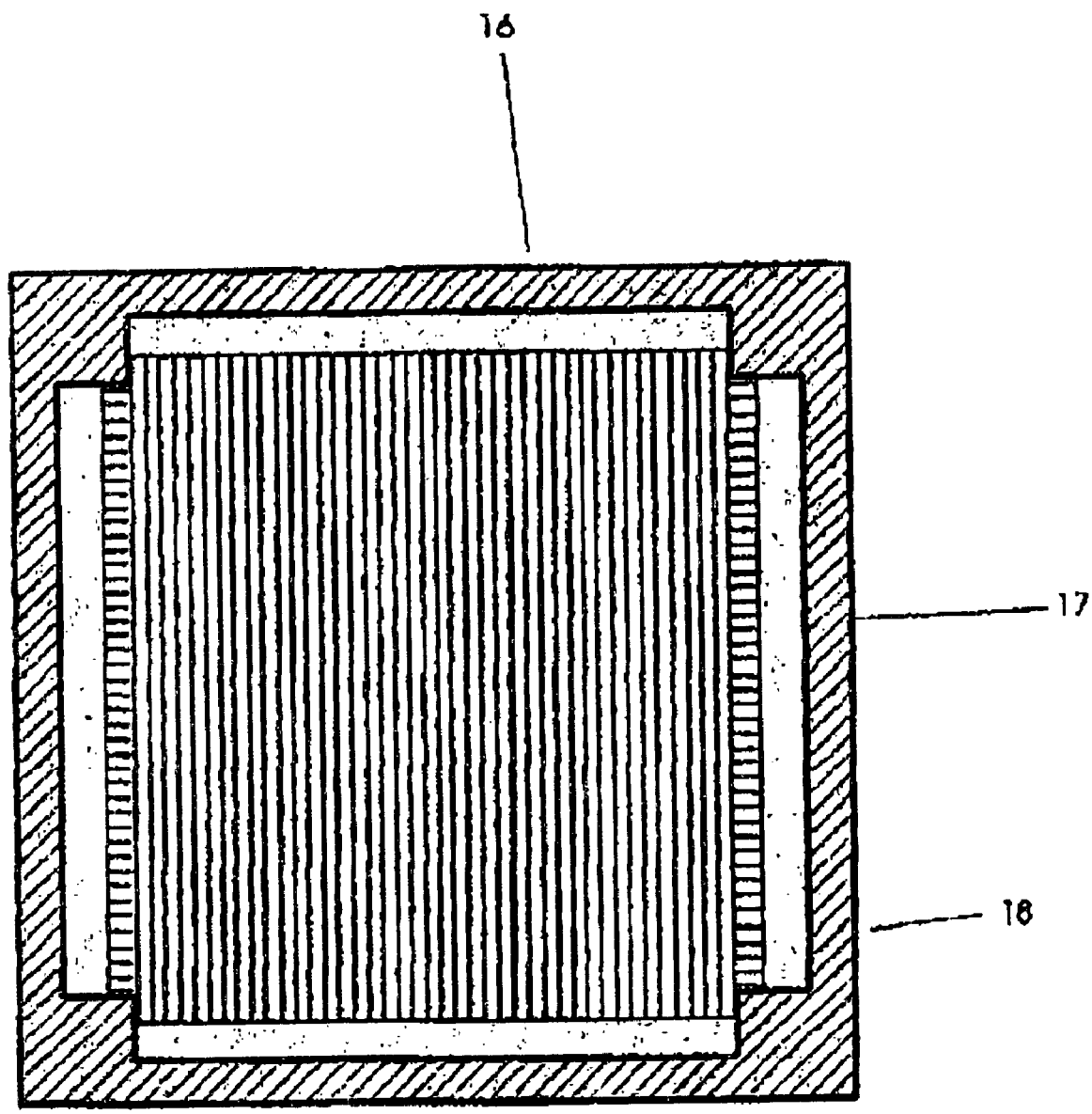
Figure 6:
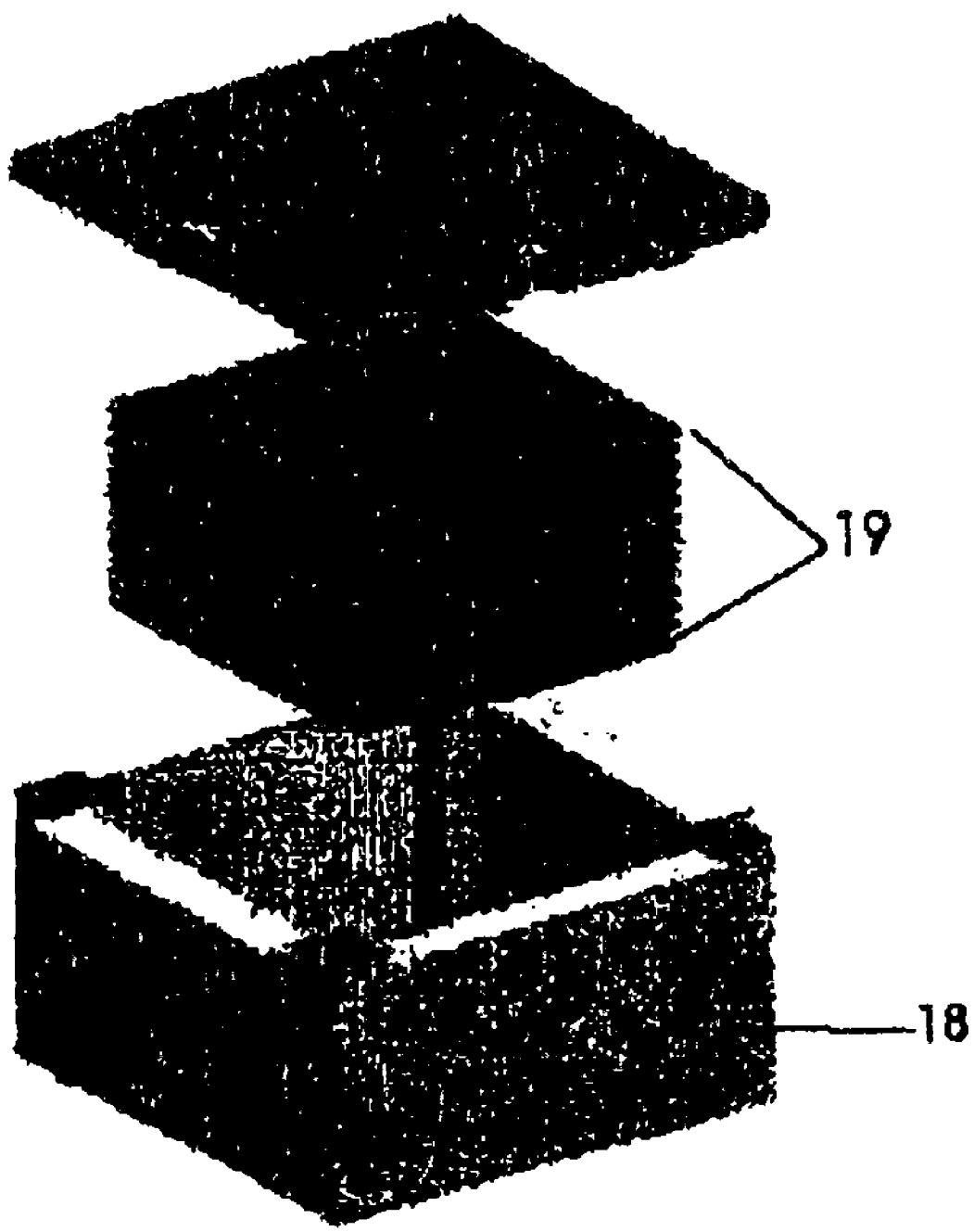
Figure 7:
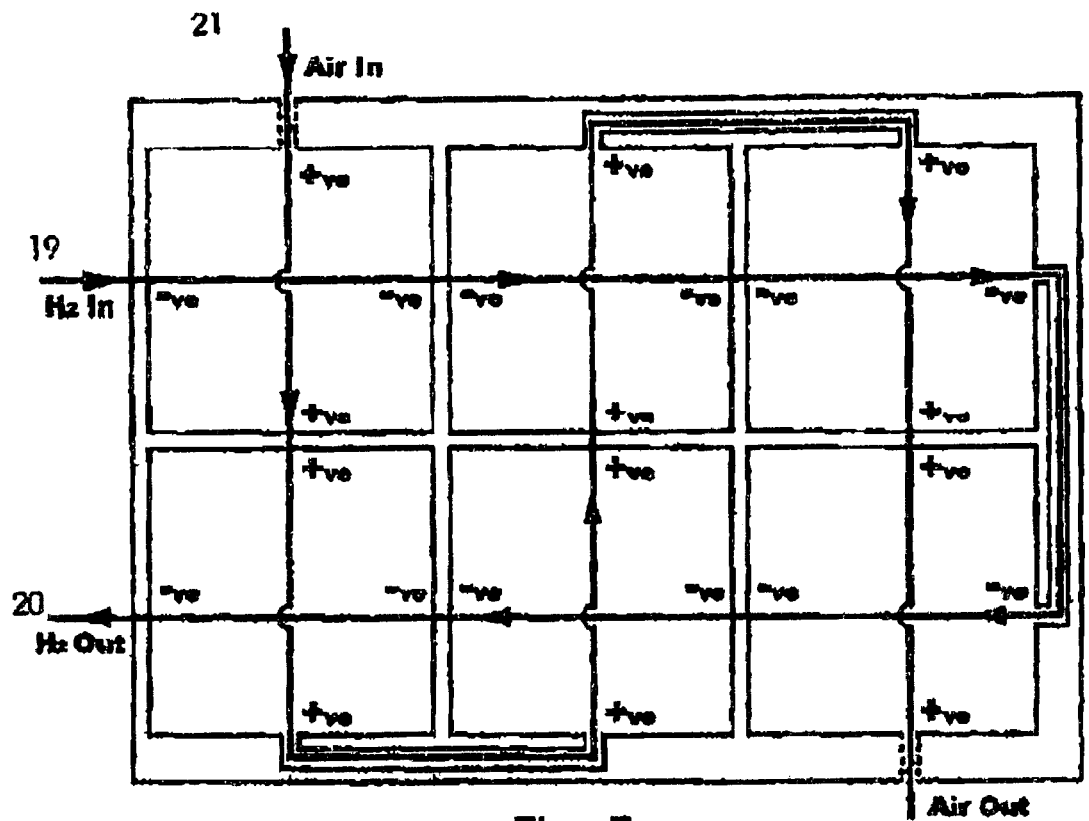
Figure 8:
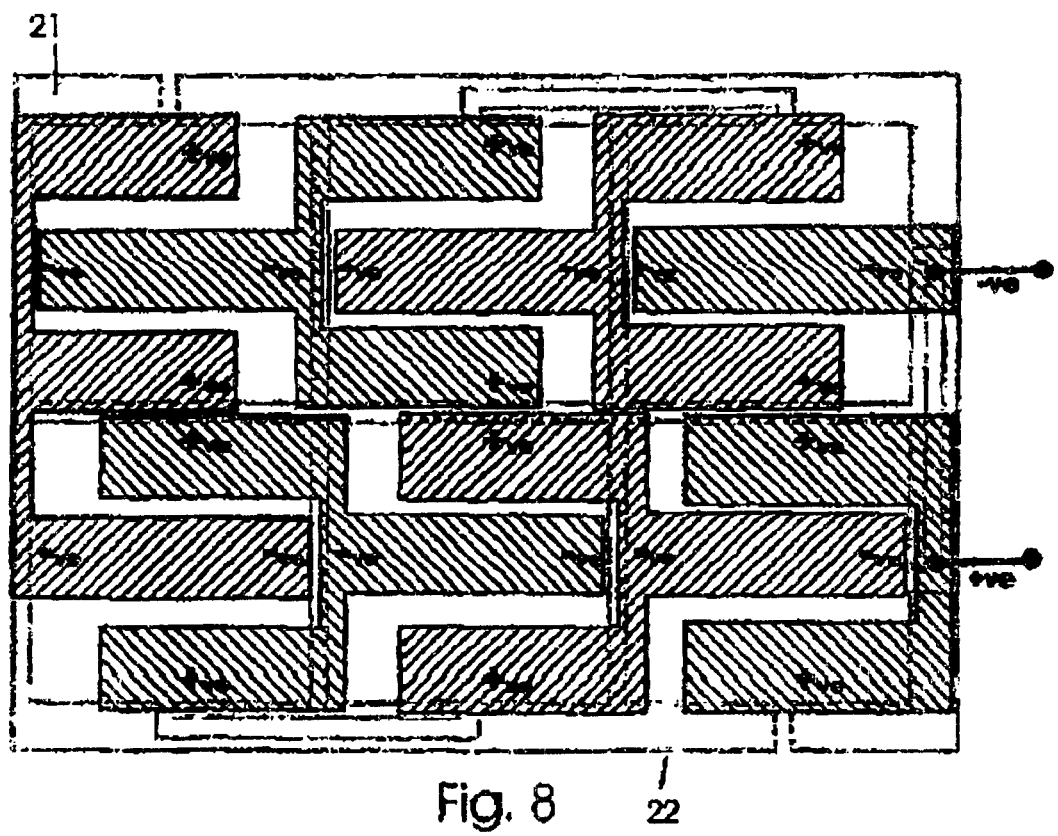
Figure 9:
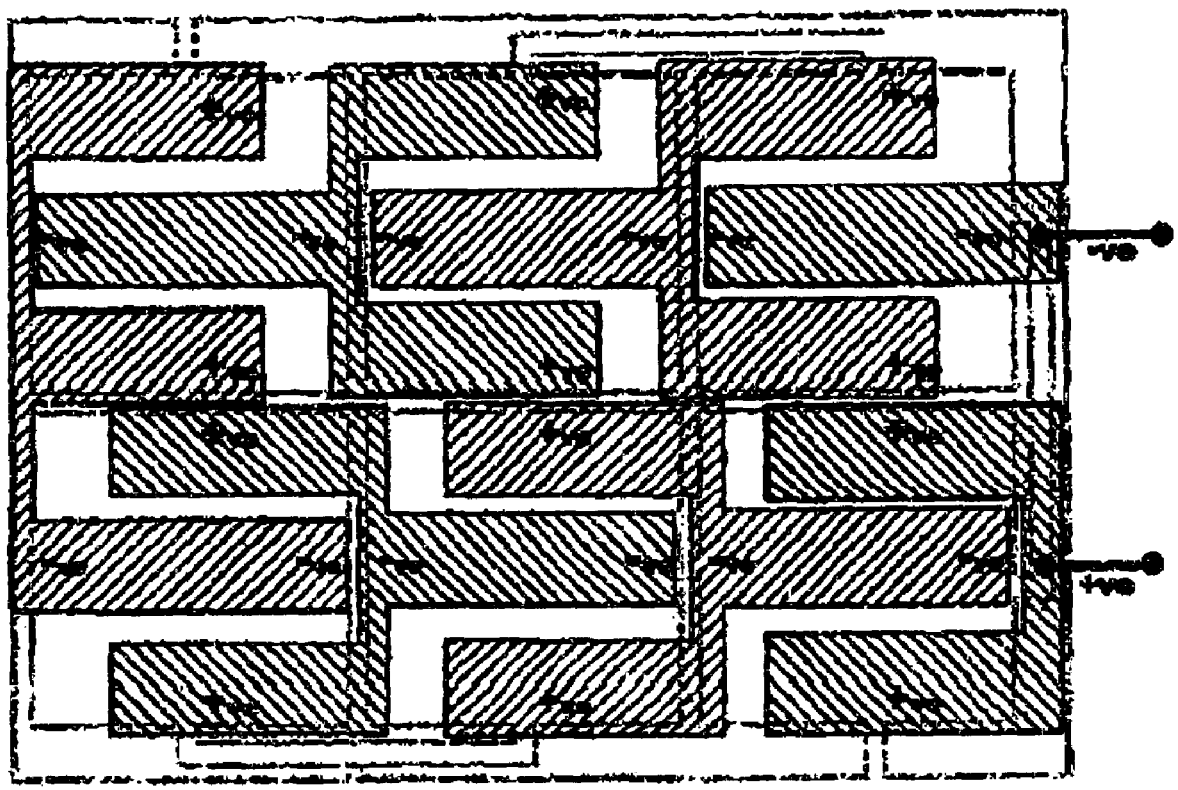

FIG. 2 shows a schematic view of part a fuel cell according to the invention showing the arrangement of the fibres FIG. 3 is a perspective view of one embodiment of the invention FIG. 4 is a perspective view of another embodiment of the invention FIG. 5 is diagram showing gas flow through a cell block FIGS. 6 and 7 are diagrams showing electrical connections between individual cells FIG. 8 shows a plan of one layer in a cell block and FIG. 9 is an exploded view of a fuel cell assembly Referring to FIG. 1 the cell comprises a bipolar plate (41), a carbon PTFE paper (42) a Nafion polymer membrane (43) and platinum "ink" (44). Bipolar graphite plates (41) which are thin graphite plates, with complex shaped pathways machined into both of the surfaces to maximise gas distribution to the catalyst layer. These plates are of the order of 2 mm thick. The catalyst layer comprises a carbon paper (42) impregnated with PTFE to control water flow and the level of hydration of the electrolyte and impregnated with the electrode catalyst at the surface in contact with the proton conducting membrane. The catalyst comprises platinum, platinum group metals or mixtures of these in the form of a highly dispersed platinum impregnated into the carbon paper (44). This paper layer is typically around 200 microns thick.

The main feed gases, hydrogen and oxygen, are fed to each side of the plate.

Referring to FIG. 2 the fibres and tubes are embedded in a Nafion polymer shown generally at (11) and the platinum coating on the fibres (1) and (3) is shown at (10a) and (10b). The oxygen air carrying flows down the passageway (1a) in the direction of the arrow. The oxygen can diffuse through the walls of the fibre (1) to the platinum layer (10a). In the hydrogen carrying fibres (3) the hydrogen will pass down the passageway (3a) and can diffuse through the walls of the fibre (3) to the platinum layer (10b). Coolant will pass down the metal tubes (2) in the direction of (2a).

In use the Nafion membrane is wetted with water and hydrogen is passed down fibres (3) and oxygen or air passes down the fibres (1), when the hydrogen diffuses through fibres (3) it is ionised at the platinum layer (10b)/Nafion interface to give H⁻ ions and when the oxygen diffuses through fibres (1) it is ionised platinum layer (10a/Nafion interface to give OH⁻ ions, the H⁺ and the OH⁻ ions combine to form water and generate electric current, the water mainly diffuses through fibres (3) and is removed in the air or oxygen stream.

The ends of the fibres (1) are connected together and the ends of the fibres (3) are connected together by conductive plates, to enable the required voltage to be produced by the cell block.

Referring to FIG. 3, a number of fibres (1) are arranged side by side in rows so as to form a first sheet of the fibres, the hollow fibres (3) are similarly arranged to form a second sheet and the fibres in each sheet are orthogonal to the fibres in the adjacent sheet. The oxygen or air flows down the fibres (1) and the fuel e.g. hydrogen flows down fibers (3) as described in FIG. 1 and the ends of the fibres (1) are supported in conducting block (14). The fibres (1) and (3) are kept apart by means of insulating mesh (12) so that a gel electrolyte can be used in place of the "Nafion" membrane shown in FIG. 1.

Referring to FIG. 4 the rows of fibres are kept apart by insulating polymer mesh (15).

Referring to FIG. 5, this shows diagrammatically two rows of fibres (16) and 917) with the fibres in row (16) being fibres (1) if FIG. 2 or 3 and row (17) being fibres (3) of FIG. 2 or 3. The ends of each row of fibres are electrically connected together and held in a block (18). To build a cell block several pairs of rows are assembled together as shown in FIG. 6 in which a block of assembled fibres shown in FIG. 5 are held in a stack.

Referring to FIG. 7 this shows six cell blocks connected together and shows the gas flows through the block. Hydrogen fuel enters at entrance (19) follows the path shown and exits at (20). Air enters at (21), flows the path shown and exits at (22). The hydrogen and air flow down their respective fibres as described above.

FIGS. 8 and 9 show two different electrical connections for the block of cells of FIG. 7.

The arrangement is chosen depends on the voltage and current requirements and resistivity of the fibres.

Power densities for fibre cells are given in the table.

The power densities, in $W/cm^3$, for the fibre dimensions given in the Tables were determined using an assumed current density, $mA/cm^2$, the available fibre surface area in a given cell volume and the expected operating voltage. The available fibre surface area was assumed to be the external surface area of a fibre and the expected operating voltage was calculated as the difference between the ideal cell voltage (0.75) and the expected losses. The expected voltage losses are ohmic losses which are an integrated function of fibre cross-sectional area, length and the material resistivity. Three cases are shown in the Tables, these represent different assumed resistivities for the carbon fibres, $1\times10^{-6}$, $1\times10^{-5}$, and $1\times10^{-4}$ ohm m. Thus range f resistivity covers that which is most expected for the carbon fibres that will be used in this improved fuel cell configuration. od is the outside diameter of the fibre and id is the inside diameter of the fibres.

TABLE 1

Fibre resistance = $1 \times 10^{-6}$ ohm m

| fibre od microns | wall thickness microns | fibre id Microns | fibre length microns | current density mA/cm² | power density W/cm³ | ohmic voltage loss | operating voltage |
|---|---|---|---|---|---|---|---|
| 200 | 25 | 150 | 1.0 | 100 | 10.41 | 00024 | 0.748 |
| 300 | 25 | 250 | 1.0 | 100 | 7.22 | 0.0023 | 0.748 |
| 200 | 50 | 100 | 1.0 | 100 | 10.42 | 0.0014 | 0.749 |
| 300 | 50 | 200 | 1.0 | 100 | 7.23 | 0.0012 | 0.749 |
| 200 | 25 | 150 | 1.0 | 200 | 26.02 | 0.0024 | 0.748 |
| 300 | 25 | 250 | 1.0 | 200 | 18.05 | 0.0023 | 0.748 |
| 200 | 50 | 100 | 1.0 | 200 | 26.06 | 0.0014 | 0.749 |
| 300 | 50 | 200 | 1.0 | 200 | 18.07 | 0.0012 | 0.749 |
| 400 | 50 | 300 | 1.0 | 500 | 27.66 | 0.0012 | 0.749 |
| 800 | 50 | 700 | 1.0 | 500 | 14.26 | 0.0011 | 0.749 |
| 400 | 100 | 200 | 1.0 | 500 | 27.68 | 0.0007 | 0.749 |
| 800 | 100 | 600 | 1.0 | 500 | 14.27 | 0.0006 | 0.749 |
| 400 | 50 | 300 | 1.0 | 750 | 41.49 | 0.0012 | 0.749 |
| 800 | 50 | 700 | 1.0 | 750 | 21.39 | 0.0011 | 0.749 |
| 400 | 100 | 200 | 1.0 | 750 | 41.52 | 0.0007 | 0.749 |
| 800 | 100 | 600 | 1.0 | 750 | 21.41 | 0.0006 | 0.749 |
| 1000 | 100 | 800 | 1.0 | 750 | 17.23 | 0.0006 | 0.749 |
| 1500 | 100 | 1300 | 1.0 | 750 | 11.58 | 0.0006 | 0.749 |
| 1000 | 200 | 600 | 1.0 | 750 | 17.24 | 0.0003 | 0.750 |
| 1500 | 200 | 1100 | 1.0 | 50 | 11.59 | 0.0003 | 0.750 |
| 1000 | 100 | 800 | 1.0 | 900 | 20.68 | 0.0006 | 0.749 |
| 1500 | 100 | 1300 | 1.0 | 900 | 13.90 | 0.0006 | 0.749 |
| 1000 | 200 | 600 | 1.0 | 900 | 20.68 | 0.0003 | 0.750 |
| 1500 | 200 | 1100 | 1.0 | 900 | 13.90 | 0.0003 | 0.751 |

TABLE 2

Fibre resistance = $1 \times 10^{-5}$ ohm m

| fibre od microns | wall thickness microns | fibre id Microns | fibre length microns | current density mA/cm² | power density W/cm³ | ohmic voltage loss | operating voltage |
|---|---|---|---|---|---|---|---|
| 200 | 25 | 150 | 1.0 | 100 | 10.11 | 0.0238 | 0.726 |
| 300 | 25 | 250 | 1.0 | 100 | 7.02 | 0.0227 | 0.727 |
| 200 | 50 | 100 | 1.0 | 100 | 10.25 | 0.0139 | 0.736 |
| 300 | 50 | 200 | 1.0 | 100 | 7.12 | 0.0125 | 0.738 |
| 200 | 25 | 150 | 1.0 | 200 | 25.2S | 0.0238 | 0.726 |
| 300 | 25 | 250 | 1.0 | 200 | 17.56 | 0.0227 | 0.727 |
| 200 | 50 | 100 | 1.0 | 200 | 25.62 | 0.0139 | 0.736 |
| 300 | 50 | 200 | 1.0 | 200 | 17.80 | 0.0125 | 0.738 |
| 400 | 50 | 300 | 1.0 | 500 | 27.27 | 0.0119 | 0.738 |
| 800 | 50 | 700 | 1.0 | 500 | 14.07 | 0.0111 | 0.739 |
| 400 | 100 | 200 | 1.0 | 500 | 27.45 | 0.0169 | 0.743 |
| 800 | 100 | 600 | 1.0 | 500 | 14.17 | 0.0159 | 0.744 |
| 400 | 50 | 300 | 1.0 | 750 | 40.90 | 0.0119 | 0.738 |
| 800 | 50 | 700 | 1.0 | 750 | 21.11 | 0.0111 | 0.739 |
| 400 | 100 | 200 | 1.0 | 750 | 41.18 | 0.0069 | 0.743 |
| 800 | 100 | 600 | 1.0 | 750 | 21.25 | 0.0059 | 0.744 |
| 1000 | 100 | 800 | 1.0 | 750 | 17.11 | 0.0058 | 0.744 |
| 1500 | 100 | 1300 | 1.0 | 750 | 11.51 | 0.0056 | 0.744 |
| 1000 | 200 | 600 | 1.0 | 750 | 17.17 | 0.0033 | 0.147 |
| 1500 | 200 | 1100 | 1.0 | 50 | 11.55 | 0.0030 | 0.747 |
| 1000 | 100 | 800 | 1.0 | 900 | 20.53 | 0.0058 | 0.744 |
| 1500 | 100 | 1300 | 1.0 | 900 | 13.81 | 0.0056 | 0.744 |
| 1000 | 200 | 600 | 1.0 | 900 | 20.60 | 0.0033 | 0.747 |
| 1500 | 200 | 1100 | 1.0 | 900 | 13.85 | 0.0030 | 0.747 |

TABLE 3

Fibre resistance = 1 × 10⁻⁴ ohm m

| fibre od microns | wall thickness microns | fibre id Microns | Fibre length microns | current density mA/cm² | power density W/cm³ | ohmic voltage loss | Operating Voltage |
|---|---|---|---|---|---|---|---|
| 200 | 25 | 150 | 1.0 | 100 | 7.13 | 0.2377 | 0.512 |
| 300 | 25 | 250 | 1.0 | 100 | 5.05 | 0.2269 | 0.523 |
| 200 | 50 | 100 | 1.0 | 100 | 8.51 | 0.1387 | 0.611 |
| 300 | 50 | 200 | 1.0 | 100 | 6.04 | 0.1248 | 0.625 |
| 200 | 25 | 150 | 1.0 | 200 | 17.83 | 0.2377 | 0.512 |
| 300 | 25 | 250 | 1.0 | 200 | 12.63 | 0.2269 | 0.523 |
| 200 | 50 | 100 | 1.0 | 200 | 21.28 | 0.1387 | 0.611 |
| 300 | 50 | 200 | 1.0 | 200 | 15.09 | 0.1248 | 0.625 |
| 400 | 50 | 300 | 1.0 | 500 | 23.32 | 0.1189 | 0.631 |
| 800 | 50 | 700 | 1.0 | 500 | 12.17 | 0.1109 | 0.639 |
| 400 | 100 | 200 | 1.0 | 500 | 25.15 | 0.0693 | 0.681 |
| 800 | 100 | 600 | 1.0 | 500 | 13.15 | 0.0594 | 0.691 |
| 400 | 50 | 300 | 1.0 | 750 | 34.97 | 0.1189 | 0.631 |
| 800 | 50 | 700 | 1.0 | 750 | 18.25 | 0.1109 | 0.639 |
| 400 | 100 | 200 | 1.0 | 750 | 37.72 | 0.0693 | 0.681 |
| 800 | 100 | 600 | 1.0 | 750 | 19.73 | 0.0594 | 0.691 |
| 1000 | 100 | 800 | 1.0 | 750 | 15.92 | 0.0578 | 0.692 |
| 1500 | 100 | 1300 | 1.0 | 750 | 10.73 | 0.0557 | 0.694 |
| 1000 | 200 | 600 | 1.0 | 750 | 16.5 | 0.0325 | 0.718 |
| 1500 | 200 | 1100 | 1.0 | 50 | 11.13 | 0.0300 | 0.720 |
| 1000 | 100 | 800 | 1.0 | 900 | 19.10 | 0.0578 | 0.692 |
| 1500 | 100 | 1300 | 1.0 | 900 | 12.88 | 0.0557 | 0.694 |
| 1000 | 200 | 600 | 1.0 | 900 | 19.8 | 0.0325 | 0.718 |
| 1500 | 200 | 1100 | 1.0 | 900 | 13.35 | 0.0300 | 0.720 |

The invention claimed is:

1. A fuel cell which comprises a plurality of first hollow electrically conductive gas permeable carbon fibres which are coated on the outside with a fuel cell catalyst and which have a means to enable a fuel vapour or gas to be passed down the inside of the fibre and a plurality of second hollow electrically conductive gas permeable carbon fibres which are coated on the outside with a fuel cell catalyst and which have a means to enable oxygen or an oxygen containing gas to be passed down the inside of the fibre with the first hollow electrically conductive gas permeable carbon fibres arranged side by side, so as to form a first sheet of the fibres, with the second hollow electrically conductive gas permeable carbon fibres arranged side by side to form a second sheet of the fibres, with the fibres in each adjacent sheet at an angle to each other and in which first electrically conductive gas permeable fibre sheet (anode) and the second electrically conductive gas permeable fibre sheet (cathode) are separated by a fuel cell proton conducting layer which is positioned in between them, and further comprising a multi-layered block formed of a plurality of alternate sheets in which the first sheet comprises a layer of the first electrically conductive gas permeable carbon fibres forming cathodes and the second sheet comprises a layer of the second electrically conductive gas permeable carbon fibres forming the anodes with the fibres in each alternate layer substantially orthogonal to each other.

2. A fuel cell according to claim 1 in which the individual fibres in each sheet are electrically connected to each other at one or both ends.

3. A fuel cell according to claim 2 in which the individual fibres in each sheet are electrically connected by means of a connecting block which contains a metal mesh that provides for making an external connection to the cell.

4. A fuel cell according to claim 1 in which the cathode fibres are connected together and the anode fibres are connected together in each block and a plurality of blocks are connected together in series and/or parallel.

* * * * *